United States Patent
Kang et al.

(10) Patent No.: US 6,673,741 B2
(45) Date of Patent: Jan. 6, 2004

(54) GUARD CATALYST AND A PROCESS FOR ITS PREPARATION

(75) Inventors: Xiaohong Kang, Beijing (CN); Kui Wang, Beijing (CN); Weizheng Dong, Beijing (CN); Qinghe Yang, Beijing (CN); Li Zhu, Beijing (CN)

(73) Assignees: China Petroleum and Chemical Corporation, Beijing (CN); Research Institute of Petroleum Processing, SINOPEC, Beijing (CN)

( * ) Notice: Subject to any disclaimer, the term of this patent is extended or adjusted under 35 U.S.C. 154(b) by 89 days.

(21) Appl. No.: 09/965,576

(22) Filed: Sep. 25, 2001

(65) Prior Publication Data

US 2002/0065193 A1 May 30, 2002

(30) Foreign Application Priority Data

Sep. 25, 2000 (CN) .................................... 00124903 A

(51) Int. Cl.[7] ................................................ B01J 23/00
(52) U.S. Cl. .................... 502/323; 502/314; 502/315
(58) Field of Search ................ 502/323, 305, 502/314, 315, 321, 325, 326, 527.19

(56) References Cited

U.S. PATENT DOCUMENTS

| 4,031,137 A | * | 6/1977 | Schmitt et al. ............. 552/204 |
| 4,225,460 A | * | 9/1980 | Newell ........................ 502/159 |
| 4,448,896 A | * | 5/1984 | Kageyama et al. ......... 502/314 |
| 4,501,685 A | * | 2/1985 | Thomson et al. ........... 502/167 |
| 4,508,841 A | * | 4/1985 | Onuma et al. ................ 502/73 |
| 4,598,060 A | * | 7/1986 | Schoenthal et al. ......... 502/263 |
| 4,624,773 A | * | 11/1986 | Hettinger et al. ...... 208/120.01 |
| 4,665,048 A | * | 5/1987 | Van Leeuwen et al. ..... 502/221 |
| 4,677,092 A | * | 6/1987 | Luczak et al. .............. 502/185 |
| 5,767,036 A | * | 6/1998 | Freund et al. .............. 502/185 |
| 6,165,635 A | * | 12/2000 | Auer et al. .................... 429/40 |
| 6,207,611 B1 | * | 3/2001 | Sun et al. .................... 502/325 |
| 6,375,735 B1 | * | 4/2002 | Stephens et al. ............ 106/600 |

* cited by examiner

*Primary Examiner*—Tom Dunn
*Assistant Examiner*—Colleen P. Cooke
(74) *Attorney, Agent, or Firm*—Pennie & Edmonds LLP

(57) ABSTRACT

A guard catalyst, comprising an alumina support and molybdenum and/or tungsten and nickel and/or cobalt supported on the alumina support, wherein the total ammonia integral adsorption heat of said alumina support does not exceed 25 J/g, the percentage taken up by the ammonia integral adsorption heat of the ammonia differential adsorption heat greater than 100 kJ/mol does not exceed 10% of the total ammonia integral adsorption heat. Compared to the catalysts of the prior art, the guard catalyst has higher catalytic activity, less coke deposit, lower reduction rate of pore volume, better stability of activity, and higher strength.

19 Claims, 3 Drawing Sheets

US 6,673,741 B2

GUARD CATALYST AND A PROCESS FOR ITS PREPARATION

FIELD OF THE INVENTION

The present invention is related to a guard catalyst and a process for its preparation, more particularly, it is related to a guard catalyst containing tungsten and/or molybdenum and nickel and/or cobalt and a process for its preparation.

BACKGROUND OF THE PRIOR ART

Hydrogenation stocks usually contain small amounts of impurities such as resins, asphaltene, carbon residue, and iron, etc., which convert to coke deposit and metal sulfides during the hydrogenation and deposit on the surface of the catalyst, and thereby plug the pores and lower the activity of the catalyst rapidly. Therefore, a catalyst bed or a reactor wherein a guard catalyst is loaded usually installed on top of the major catalyst bed to trap the impurities and thereby retard the deactivation of the catalyst by passing the hydrogenation stock though the bed or reactor.

In order to lodge metals and deposited coke, the guard catalyst must have large pores for resins, asphaltene and metals to deposit therein as much as possible. Because of the undulation of the temperature during reaction, if the strength of the guard catalyst is not high enough, the catalyst is prone to break and the pressure drop of the catalyst bed will increase, therefore the guard catalyst must have high strength. Therefore, it is very important to develop a guard catalyst with high strength, large pore size, large pore volume, and low deactivation rate.

U.S. Pat. No. 4,448,896 discloses a guard catalyst for removing sulfur and heavy metals, which comprises (1) at least one metal component selected from the group consisting of metals in groups VIB and VIII as an active component of the catalyst and (2) a porous support of active alumina. This support is prepared by molding the mixture of carbon black powder and active alumina or a precursor of active alumina and calcining the dried mixture in an oxygen-containing atmosphere to burn off the carbon black powder. This catalyst has a specific surface of 100–350 m$^2$/g, preferably 200–300 m$^2$/g, a pore volume of 0.5–1.5 ml/g, preferably 0.5–1.5 ml/g. It is preferable that at least 90% of the total pore volume is taken up by the pores with diameters of 35.7–1000 Å, and there is a peak at a diameter smaller than 100 Å and a peak in the range of 100–1000 Å respectively. The volume of the pores with diameters of 37.5–100 Å is at least 0.2 ml/g, preferably 0.4–0.7 ml/g, and the volume of the pores with diameters of 100–1000 Å is at least 0.2 ml/g, preferably 0.2–0.5 ml/g. The catalyst uses carbon black powder as a pore expander, and the prepared catalyst has a lager pore volume, but the strength of the catalyst is greatly lowered since the amount of the carbon black powder is up to over 10%. In addition, using a large amount of carbon black powder is unfavorable to the control of the temperature in the calcination of the catalyst support, and a run away of the temperature is easy to take place.

CN 1,179,356A discloses a catalyst support and a process for its preparation. The catalyst support consists of γ-alumina, which has a pore volume of 0.65–0.88 ml/g and a specific surface of 225–290 m$^2$/g. The volume of the pores with diameters of 7–13 nm accounts for 80–95% of the total pore volume, that with diameters smaller than 7 nm accounts for 2–15% of the total pore volume, and that with diameters greater than 13 nm accounts for 2–15% of the total pore volume. The process for preparing the catalyst support comprises weighing pseudo-boehmite dry gel, adding an aqueous alkali solution in the amount of 20–60 wt % of the pseudo-boehmite dry gel, adding an aqueous acidic solution in an amount of 40–60 wt % of the pseudo-boehmite dry gel after sufficient kneading, molding by extrusion after sufficient kneading, drying at 80–140° C. for 1–5 h, calcining at 700–900° C. for 2–5 h. The catalyst has a larger pore volume and a larger specific surface, and a concentrated pore distribution. However, this catalyst is prepared by first adding alkali aqueous solution and then adding acid aqueous solution. Although the peptization is decreased and the pore diameter is enlarged by the neutralization reaction, the strength of the support is sacrificed.

CN 1,160,602A discloses a large pore alumina support and a process for its preparation. This alumina support has a pore volume of 0.8–1.2 ml/g, a most probable pore diameter of 15–20 nm, a bulk density of 0.5–0.6 g/ml, a specific surface of 110–200 m$^2$/g. The process for preparing the alumina support comprises mixing pseudo-boehmite with water or an aqueous solution, kneading the mixture into a plastic mass, molding by extrusion, drying and calcining. The improvement is the addition of a pore expander of combustible solid particulate and a pore expander containing phosphor, silicon, or boron compounds which can react with pseudo-boehmite or alumina. This alumina support also has a drawback of low strength.

CN 1,103,009A discloses a process for preparing an alumina having a dual pore structure. This alumina is prepared by mixing and molding two sorts of alumna or its precursors with different pore distributions with a carbon black powder, a surfactant, a peptizator and water, and then drying and calcining. More particularly, the process for preparing the alumna comprises mixing two sorts of alumna or its precursors with different pore distributions to uniformity, mixing the mixed alumina with a carbon black powder, a surfactant, a peptizator in the ratio of 1: 0.05–0.1: 0.05–0.1: 0.02–0.05 and water, molding, drying at 100–130° C., and then calcining at 550–650° C. for 1–4 h. In this alumina, the volume of the pores with diameters of 100–200 Å accounts for over 50% of the total pore volume, and the volume of the pores with diameters over 1000 Å accounts for 5–30% of the total pore volume. The alumina support prepared by using this process has higher strength. Compared to the process disclosed in U.S. Pat. No. 4,448,896, this process uses less carbon black powder and suits the industrial application.

It is well known that an alumina support itself possesses some acidity, which is the site for coke deposit. In order to reduce the coke deposit, silica is typically used as a catalyst support. However, silica is difficult to be molded, leading to a poor strength of the catalyst. When alumina is used as a support, the strength of the catalyst is better, but the catalyst is prone to coke deposition. All the above prior arts have not considered the problem of the coke deposition of the catalyst.

The objectives of the present invention are to overcome the drawbacks prone to coke deposition and of low strength and provide a guard catalyst which is not prone to coke deposition and has a higher strength. Another objective of the present invention is to provide a process for preparing the catalyst.

SUMMARY OF THE INVENTION

The guard catalyst provided by the present invention comprises an alumina support and molybdenum and/or tungsten and nickel and/or cobalt supported on the alumina support. The total ammonia integral adsorption heat of said alumina support does not exceed 25 J/g, wherein the percentage of the ammonia integral adsorption heat with the ammonia differential adsorption heat greater than 100 kJ/mol does not exceed 10% of the total ammonia integral adsorption heat.

The process provided by the present invention for preparing the catalyst comprises mixing a hydrated alumina, a carbon black powder, an organic pore expander, a peptizator and water, molding by extrusion, drying, calcining, impregnating metal components, and drying and calcining again, wherein said carbon black powder has been regulated and the wet powder has a pH of at least 8. The amount of each component is such that 1 part by weight of alumina corresponds to 0.03 to less than 0.05 part by weight of carbon black powder, 0.05–0.2 part by weight of organic pore expander, and 0.02–0.05 part by weight of peptizator.

In a preferred catalyst provided by the present invention, said total ammonia integral adsorption heat of said alumina support is 20–25 J/g, wherein the percentage of the ammonia integral adsorption heat with the ammonia differential adsorption heat greater than 100 kJ/mol accounts for 7–10% of the total ammonia integral adsorption heat. The alumina may be various aluminas which accord with the above conditions such as γ-alumina, η-alumina, etc., with γ-alumina preferred.

DETAILED DESCRIPTION OF THE INVENTION

The method for the determination of the ammonia integral adsorption heat and the ammonia differential adsorption heat is as follows:

1. The instrument Used

The instrument used is an HT-1000° C. Calvet model high temperature microcalorimeter (made by SETARAM Co., France).

2. Determination of the Adsorption Heat

The process for determining the adsorption heat is described bellow in combination with the drawing.

As shown in FIG. 4, six-way valve 13 is set to the "sampling" position. Two samples of 1.0000 g of alumina is accurately weighed and charged into sample cell 16 and reference cell 10 of the calorimeter 20 respectively. High-purity nitrogen from cylinder 5 enters into flow stabilizing valve 7 via line 6, by which the flow rate is regulated to 15 mil/min. Then the high-purity nitrogen enters into reference cell 10 of the calorimeter 20 via flow meter 8 and line 9 and flushes alumina support 11 in reference cell 10. Said nitrogen then enters into sample cell 16 of the calorimeter 20 via line 12, six-way valve 13 (now said nitrogen is not connected with sampling tube 14), and line 15 and flushes alumina support 11 in sample cell 16. Then said nitrogen is vented or analyzed via line 17. The temperature of the reference cell 10 and sample cell 16 is maintained constant at 420K, which is measured with thermocouple 18 inserted into calorimeter 20. Meanwhile, high-purity ammonia from cylinder 22 sequentially enters into flow regulating valves 25 and 26 via line 23 and pressure stabilizing valve 24. After regulation of the flow rate by flow regulating valves 25 and 26, the high-purity ammonia enters into buffer 28 via line 27, and then is vented from line 32 via line 29, flow meter 30, line 31, six-way valve 13 (via sampling tube 14). After 12 h of thermostatic flushing, six-way valve 13 is switched to the "sample entering" position, and at this moment, ammonia from 31 is vented from line 32 directly via six-way valve 13 (not via sampling tube 14). The nitrogen from line 12 carries the ammonia in sampling tube 14 and enters into sample cell 16 via sampling tube 14. Ammonia is adsorbed on alumina support 11 in sample cell 16 and heat is released. The heat effect is detected by thermopile 19 in calorimeter 20, transmitted to microvolt amplifier 21 in a form of thermal potential, amplified and integrated, and the counting result is displayed by an integration counter. The amount of each ammonia input and each counting result are recorded and the ammonia differential adsorption heat q (kJ/mol ammonia, abbreviated as kJ/mol) is calculated according to the following equation: $q = kn/ad$, wherein q is the ammonia differential adsorption heat, k is the calorific constant (kJ/count), n is the integral count (count), and ad is the amount of each ammonia input (mmol). The experiment is continued until the differential adsorption heats generated by the adjacent two inputs of ammonia become constant, The average value of the ammonia differential adsorption heat before the differential adsorption heats generated by the adjacent two inputs of ammonia become constant, multiplied by the total amount of the ammonia inputs before the differential adsorption heats generated by the adjacent two inputs of ammonia become constant, and divided by the weight of the catalyst in the sample cell yields the total ammonia integral adsorption heat of the catalyst (J/g-catalyst, abbreviated as J/g). The average value of the ammonia differential adsorption heats greater than 100 kJ/mol, multiplied by the total amount of the ammonia inputs which generate the ammonia differential adsorption heats over 100 kJ/mol, and divided by the weight of the catalyst in the sample cell yields the ammonia integral adsorption heat with the ammonia differential adsorption heats over 100 kJ/mol.

The method for calibrating the calorific constant comprises exerting a Joule current of a voltage of 6.2 V, a current of 10 mA on the thermostatic standard Joule cell in the calorimeter for 120 s with an EJP constant-current supply, and recording the integral count of the heat effect to obtain the energy corresponding each counting unit (count), which is calorific constant k.

The amount of each ammonia input is controlled by sampling tube 14 of six-way valve 13. Although the volume of said sampling tube 14 is definite, the temperature and pressure of each ammonia input are different, therefore the amount of ammonia at different temperature and pressure should be calibrated. The amount of ammonia in the sampling tube at different temperature and pressure should also be calibrated when measuring the differential adsorption heat of the alumina so as to determine the differential adsorption heat of alumina more accurately. The method for calibrating the amount of ammonia inputs comprises absorbing the ammonia in sampling tube 14 with 180 mil of distilled water at different temperatures and pressures, and determining the amount of the ammonia by titration with 0.1 N hydrochloric acid.

The purity, impurity contents, and the producers of the high purity nitrogen and high purity ammonia are shown in Table 1.

TABLE 1

| Gas | Purity, % | Content of Impurity, ppm | | | | | | Producer |
|---|---|---|---|---|---|---|---|---|
| | | $H_2$ | O | $H_2$ | C | CO | $C_nH$ | |
| High-purity | 99.999 | <2. | < | < | <1 | <0. | — | Beijing |
| High-purity | 99.999 | <1 | < | — | — | — | <2 | Beijing |

According to a preferred embodiment of the present invention, said catalyst has the following pore distribution:

the volume of the pores with the diameters of 100–200 Å accounts for 50–90% of the total pore volume, the volume of the pores with the diameters of 200–1000 Å accounts for 5–30% of the total pore volume, the volume of the pores with diameters greater than 1000 Å accounts for 5–40% of the total pore volume, and the remaining volume is taken up by the pores with diameters smaller than 100 Å.

According to a more preferred embodiment of the present invention, said catalyst has the following pore distribution: the volume of the pores with the diameters of 100–200 Å accounts for 55–80% of the total pore volume, the volume of the pores with the diameters of 200–1000 Å accounts for 5–20% of the total pore volume, the volume of the pores with diameters greater than 1000 Å accounts for 8–25% of the total pore volume, and the remaining volume is taken up by the pores with diameters smaller than 100 Å.

In the catalyst provided according to the present invention, the content of molybdenum and/or tungsten is 1–10 wt %, preferably 4–9 wt %, and the content of nickel and/or cobalt is 0.5–3 wt %, preferably 0.5–2.5 wt % based on the total weight of the catalyst and calculated as oxides.

In the process provided according to the present invention for preparing the catalyst, said hydrated alumina is one or more hydrated aluminas typically used as the precursors of alumina supports such as bayerite, pseudo-boehmite and boehmite, with pseudo-boehmite preferred. Pseudo-boehmite can be prepared by various prior methods such as the aluminum sulfate method or $CO_2$-sodium meta-aluminate method.

Said carbon black powder can be the ethylene carbon black, channel black, highly wearable carbon black, etc. typically used in industry, The inventors of the present invention have discovered that pHs of all these carbon black powders measured when they are wet are lower than 8 and the projective of the present invention can not be attained by using these carbon black powders directly. The inventors of the present invention have unexpectedly discovered that the pH of wet carbon black powder has very important influence on the properties of the alumina support. In order to attain the objective of the present invention and allow the adsorption heat of the alumina support to meet the demand, the pH of wet carbon black powder must be regulated. According to the present invention, the method for regulating the pH of the wet carbon black powder comprises mixing a solution of a nitrogen-containing alkali compound with said carbon black powder, and adding a acidic solution to bring the pH of the mixed solution to at least 8, preferably 8–12, filtering away the solution to obtain a wet carbon black powder with a pH of at least 8, preferably 8–12. Said solution of nitrogen-containing alkali compound is one or more selected from the group consisting of aqueous ammonia, aqueous solutions of organic amines and urea, with aqueous ammonia being preferred. Said acidic solution is one or more selected from the group consisting of various organic and inorganic acids, with nitric acid, hydrochloric acid and organic acids with 1–5 carbon atoms being preferred, and nitric acid particularly preferred.

Said organic pore expander may be one or more selected from polymerized alcohol and polymerized ethers containing no nitrogen such as polyethylene glycol and polyvinyl alcohol with different molecular weight. It may also be one or more selected from non-ionic surfactants, e.g. linear polyether primary alcohols. Said organic pore expander may also be mixtures of the aforesaid polymerized alcohols and polymerized ethers containing no nitrogen with non-ionic surfactants. Said peptizator may be one or more selected from the peptizators typically used in the art such as soluble aluminum salts, organic acids and inorganic acids According to the process provided by the present invention, an adequate amount of lubricant and/or extrusion aid such as starch, cellulose, etc., the amount of which is well known to the skilled in the art, may be added into the mixture to be extruded. The catalyst may be fabricated into different shapes, such as cylinder, trilobal, quatrefoil, butterfly, etc. depending on different demands for the catalyst.

According to the process provided by the present invention, the drying and calcining temperatures of said molded alumina support are the conventional drying and calcining temperatures, e.g., the drying temperature may be room temperature to 300° C., preferably 90–150° C., calcining temperature is 500–700° C., preferably 550–650° C., and the calcining time is at least 0.5 h, preferably 1–8 h.

The drying and calcining temperatures of the alumina after impregnation with metal components are also the conventional drying and calcining temperatures, e.g., the drying temperature may be room temperature to 200° C., preferably 90–150° C., calcining temperature is 300–600° C., preferably 450–550° C., and the calcining time is at least 0.5 h, preferably 1–8 h.

The guard catalyst provided by the present invention has the following advantages:

1. Compared to the catalysts of the prior art, the catalyst provided by the present invention has a higher catalytic activity. For example, when 10 g of the catalyst of the present invention containing 1.2 wt % nickel oxide and 5.1 wt % molybdenum oxide is used to perform deferrization of 200 ml of a feed oil containing 100 ppm of iron in a 0.5 l of vibrating autoclave reactor under a temperature of 380° C. and a pressure of 8 MPa, the deferrization rate is up to 85 wt % after 2 h of reaction, while the deferrization rate is only 65–82 wt % when using the catalyst of the prior art containing the same content of molybdenum and nickel under the same conditions.

2. The catalyst provided by the present invention has less coke deposit, therefore has lower reduction rate of the pore volume and better stability of activity. For example, when 10 g of the catalyst of the present invention containing 1.2 wt % nickel oxide and 5.1 wt % molybdenum oxide is used to perform deferrization of 200 ml of a feed oil containing 100 ppm of iron in a vibrating autoclave reactor, the amount of the coke deposit is only 6.8 wt %, and the reduction rate of the pore volume is only 15%, after 2 h of reaction, while the amount of the coke deposit is up to 10.5–18.8 wt %, and the reduction rate of the pore volume is up to 24–40% when using the catalyst of the prior art containing the same content of molybdenum and nickel under the same conditions. For another example, when the catalyst of the present invention containing 1.2 wt % nickel oxide and 5.1 wt % molybdenum oxide is used to perform carbon residue removal of 200 ml of a feed oil containing 15.2 wt % of carbon residue in a 100 ml continuous down-flowing reactor under a temperature of 380° C., a pressure of 10 MPa, a hydrogen/oil volume ratio of 800, and a liquid hourly space velocity of 10 $h^{-1}$, the removal rate of carbon residue is still up to 70 wt % after 3000 h of reaction, while the removal rate of carbon residue is only about 32–65 wt % after 3000 h of reaction when using the catalyst of the prior art containing the same content of molybdenum and nickel under the same conditions, see FIG. 3.

3. The guard catalyst provided by the present invention has higher strength. For example, the strengths of all the catalysts provided by the present invention are not lower than 13.5 N/mm, while the strengths of all the catalysts of the prior art are not higher than 10.5 N/mm. Thus the catalyst provided by the present invention is favorable to the elongation of the operation period of the plant.

The guard catalyst of the present invention may be used as a protection agent of feed oil with high content of impurities, and is particularly suitable for use in the front-mounted bed to protect the downstream main catalyst.

The operation conditions of the guard catalyst provided by the present invention are the conventional conditions, e.g., the reaction temperature is 230–420° C., preferably 300–410° C.; the reaction pressure is 0.3–18 MPa, preferably 0.7–15 MPa; the liquid hourly space velocity is 1–20 $h^{-1}$, preferably 2–10 $h^{-1}$; and the hydrogen/oil volume ratio is 90–2000, preferably 200–1000.

Figure 1:
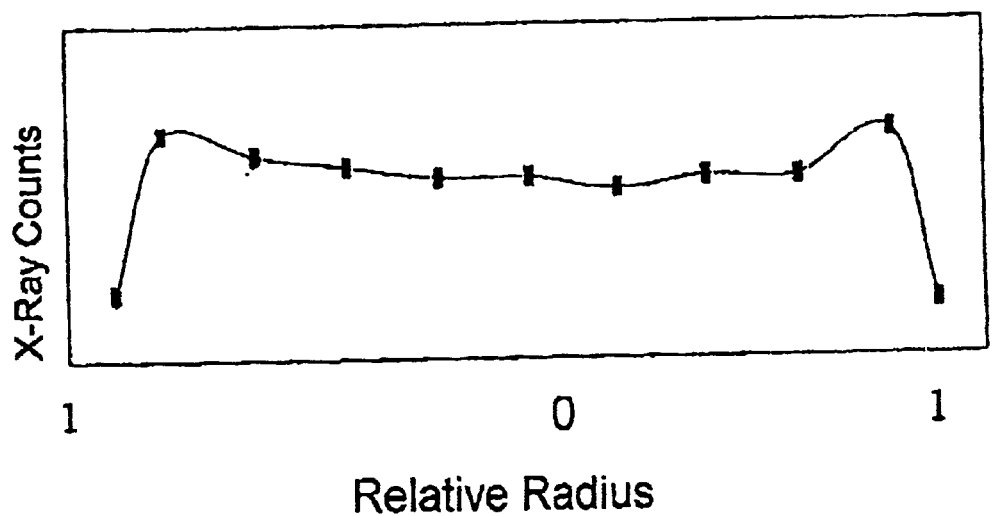
FIG. 1 is the distribution profile of iron deposited on the catalyst provided by the present invention.

The following examples will further describe the present invention, but they are not a limitation to the present invention.

EXAMPLES

Example 1

Preparation of the catalyst provided by the present invention.

1.5 g of highly wearable carbon black powder (made by Tianjin Carbon Black Plant) was mixed with 20 ml of aqueous ammonia having a concentration of 65 wt %. The pH of the mixture was regulated to 9 with a nitric acid solution having a concentration of 65 wt %. The obtained wet carbon black powder after filtration was mixed with 33 g (dry basis) of pseudo-boehmite (Trade name is aluminum hydroxide dry gel, made by Chanling Catalyst Plant, solid content is 65 wt %) to uniformity, and 2 g of a surfactant, linear polyether primary alcohol (Trade brand is SA-20, made by Tianjin Assistant Plant) was added. The mixture was milled for 5 min, and 1.2 g of a peptizator, aluminum nitrate (made by Beijing Chemical Industry Plant) was added. The milling is continued for 10 min (alumina: carbon black powder: organic pore expander: peptizator=1: 0.045: 0.061: 0.036). The obtained mixture was extruded into trilobal strip with a circumcircle diameter of 1.8 mm, which was dried at 120° C., and calcined at 600° C. for 4 h to obtain Catalyst Support Z1. Table 2 shows the total ammonia integral adsorption heat of Support Z1 and the percentage taken up by the ammonia integral adsorption heat of the ammonia differential adsorption heat greater than 100 kJ/mol in the total ammonia integral adsorption heat. 40 g of support Z1 was impregnated with 26 ml of mixed aqueous solution of nickel nitrate and ammonium is paramolybdate containing 19.7 g/l of nickel oxide and 83.7 g/l of molybdenum oxide, then dried at 120° C. and calcined at 480° C. for 4 h to obtain Catalyst C1. The metal contents and the physicochemical properties of Catalyst C1 are shown in Table 3–5, wherein the contents of nickel, molybdenum and tungsten were obtained by calculation. The specific surface, pore volume and pore distribution were determined by the mercury intrusion method. The determination of the compressive strength was referred to "Analytical Methods in Petroleum Industry (PIPP Test Methods)" pp. 66–67, Science Press, 1990.

Comparative Example 1

A catalyst was prepared according to the process of CN 1103009A.

The catalyst was prepared according to the process of Example 1, except that 1.8 g of carbon black powder was used directly without regulation of the pH with aqueous ammonia and nitric acid. Reference Support ZB1 and Reference Catalyst CB1 were obtained. Table 2 shows the total ammonia integral adsorption heat of Support ZB1 and the percentage taken up by the ammonia integral adsorption heat of the ammonia differential adsorption heat greater than 100 kJ/mol in the total ammonia integral adsorption heat. Tables 3–5 show the composition and physicochemical properties of Catalyst CB1.

Comparative Example 2

Preparation of a reference catalyst.

A support and a catalyst were prepared according to the process of Example 1 of U.S. Pat. No. 4,448,896, except that said pseudo-boehmite and carbon black powder, the pH of which had not been regulated, in Example 1 were used to replace said boehmite and carbon black powder in Example 1 of U.S. Pat. No. 4,448,896. The extrusion condition, drying and calcining temperature and time, and impregnation solution were the same as in Example 1 of the present invention. Reference Catalyst Support ZB2 and Reference Catalyst CB2 were obtained. Table 2 shows the total ammonia integral adsorption heat of Support ZB2 and the percentage taken up by the ammonia integral adsorption heat of the ammonia differential adsorption heat greater than 100 kJ/mol in the total ammonia integral adsorption heat. Tables 3–5 show the composition and physicochemical properties of Catalyst CB2.

Comparative Example 3

Preparation of a reference catalyst.

1.5 g of highly wearable carbon black powder (the same as Example 1) was mixed with 33 g (dry basis) of pseudo-boehmite (the same as Example 1) to uniformity, and 2 g of the surfactant said in Example 1 was added. The mixture was milled for 5 min, thereto 39.2 g of 4.3 wt % aqueous nitrate solution was added, and the mixture was kneaded. Then 18.8 g of 2.1 wt % aqueous ammonia was added. The mixture was molded by extrusion, dried and calcined according to the process in Example 1 to obtain Reference Catalyst Support ZB3. Support ZB3 was impregnated with metal components, dried and calcined according to the process in Example 1 to obtain Reference Catalyst CB3. Table 2 shows the total ammonia integral adsorption heat of Support ZB3 and the percentage taken up by the ammonia integral adsorption heat of the ammonia differential adsorption heat greater than 100 kJ/mol in the total ammonia integral adsorption heat. The composition and the physicochemical properties of Catalyst CB3 are shown in Table 3–5.

Comparative Example 4

Preparation of a reference catalyst.

A catalyst was prepared according to the process in Comparative Example 3, except that the amount of the nitric acid solution was 7.1 g and that the amount of the aqueous ammonia was 3.4 g. Reference Support ZB4 and Reference Catalyst CB4 were obtained. Table 2 shows the total ammonia integral adsorption heat of Support ZB4 and the percentage taken up by the ammonia integral adsorption heat of the ammonia differential adsorption heat greater than 100 kJ/mol in the total ammonia integral adsorption heat. Tables 3–5 show the composition and physicochemical properties of Reference Catalyst CB4.

Example 2

Preparation of a catalyst provided by the present invention.

The catalyst support and catalyst were prepared according to the process in Example 1, except that the pH was regulated to 10.0 and that the contents of nickel oxide and molybdenum oxide in the mixed solution of nickel nitrate and ammonium paramolybdate were 23.1 g/l and 92.3 g/l, respectively. Support Z2 and Catalyst C2 were obtained. Table 2 shows the total ammonia integral adsorption heat and the percentage taken up by the ammonia integral adsorption heat of the ammonia differential adsorption heat greater than 100 kJ/mol in the total ammonia integral adsorption heat. Tables 3–5 show the composition and physicochemical properties of Catalyst C2.

Example 3

Preparation of a catalyst provided by the present invention.

The catalyst support and catalyst were prepared according to the process in Example 1, except that 3 g of polyethylene glycol (molecular weight was 1500, Tiantai Fine Chemical Products Ltd., Tianjin) was used to replace 2 g of SA-20, and that 1.2 g of nitric acid to replace 1.2 g of aluminum nitrate (alumina: carbon black powder: organic pore expander: peptizator=1: 0.039: 0.12: 0.036), and that a mixed solution of nickel nitrate and ammonium metatungstate containing 24.9 g/l of nickel oxide and 96.3 g/l of tungsten oxide to replace the mixed solution of nickel nitrate and ammonium metatungstate in Example 1. Catalyst Support Z3 and Catalyst C3 were obtained. Table 2 shows the total ammonia integral adsorption heat and the percentage taken up by the ammonia integral adsorption heat of the ammonia differential adsorption heat greater than 100 kJ/mol in the total ammonia integral adsorption heat. Tables 3–5 show the physicochemical properties of Catalyst C3.

Examples 4–5

Preparation of the catalysts provided by the present invention.

The catalyst supports and catalysts were prepared according to the process in Example 1, except that the mixed aqueous solution of nickel nitrate and ammonium paramolybdate contain 35.4 g/l of nickel oxide and 1344.83 g/l of molybdenum oxide, 11.8 g/l of nickel oxide and 73.7 g/l of molybdenum oxide respectively, and that the calcination temperatures were 500° C. and 550° C. respectively, and the calcination times were 8 h and 4 h respectively. Catalysts C4 and C5 were obtained. The compositions and physicochemical properties of Catalyst C4 and C5 are shown in Tables 3–5.

TABLE 2

| No. of example | No. of support | Total ammonia integral adsorption heat, J/g | Percentage taken up by the ammonia integral adsorption heat of the ammonia differential adsorption heat greater than 100 kJ/mol in the total ammonia integral adsorption heat, % |
|---|---|---|---|
| 1 | Z1 | 22 | 9.78 |
| Comparable Example 1 | ZB1 | 37 | 10.32 |
| Comparable Example 2 | ZB2 | 40 | 11.62 |
| Comparable Example 3 | ZB3 | 56 | 12.41 |
| Comparable Example 4 | ZB4 | 45 | 11.60 |
| 2 | Z2 | 25 | 8.80 |
| 3 | Z3 | 21 | 9.88 |

TABLE 3

| | | Metal content in catalyst, wt % | | |
|---|---|---|---|---|
| No. of example | No. of catalyst | Nickel oxide | Molybdenum oxide | Tungsten oxide |
| 1 | C1 | 1.2 | 5.1 | — |
| Comparative Example 1 | CB1 | 1.2 | 5.1 | — |
| Comparative Example 2 | CB2 | 1.2 | 5.1 | — |
| Comparative E[]xample 3 | CB3 | 1.2 | 5.1 | — |
| Comparative Example 4 | CB4 | 1.2 | 5.1 | — |
| 2 | C2 | 1.4 | 5.6 | — |
| 3 | C3 | 1.5 | — | 5.8 |
| 4 | C4 | 2.1 | 8.0 | — |
| 5 | C5 | 0.7 | 4.5 | — |

TABLE 4

| No. of example | No. of catalyst | Pore volume ml/g | Specic surface, m²/g | Strength, N/mm |
|---|---|---|---|---|
| 1 | C1 | 0.65 | 180 | 16.2 |
| Comparative Example 1 | CB1 | 0.51 | 185 | 10.5 |
| Comparative | CB2 | 0.68 | 150 | 10.3 |

TABLE 4-continued

| No. of example | No. of catalyst | Pore volume ml/g | Specic surface, m²/g | Strength, N/mm |
|---|---|---|---|---|
| Example 2 Comparative Example 3 | CB3 | 0.74 | 152 | 8.2 |
| Comparative Example 4 | CB4 | 0.65 | 180 | 10.4 |
| 2 | C2 | 0.64 | 172 | 14.7 |
| 3 | C3 | 0.65 | 177 | 13.5 |
| 4 | C4 | 0.66 | 182 | 15.1 |
| 5 | C5 | 0.72 | 178 | 14.3 |

TABLE 5

| No. of example | No. of catalyst | Pore distribution, % | | | | |
|---|---|---|---|---|---|---|
| | | <100 Å | 100–200 Å | 200–500 Å | 500–1000 Å | >1000 Å |
| 1 | C1 | 8.2 | 67.4 | 4.4 | 6.0 | 14.0 |
| 2 | C2 | 8.0 | 65.2 | 4.8 | 6.7 | 15.3 |
| 3 | C3 | 8.0 | 67.6 | 4.2 | 6.7 | 13.5 |
| 4 | C4 | 8.2 | 55.0 | 4.7 | 9.1 | 14.0 |
| 5 | C5 | 8.0 | 64.7 | 5.5 | 9.2 | 12.6 |

It can be seen from Table 2 that the total ammonia integral adsorption heat of all of the catalyst supports provided by the present invention are not exceed 25 J/g, and the percentage taken up by the ammonia integral adsorption heat of the ammonia differential adsorption heat greater than 100 kJ/mol in the total ammonia integral adsorption heat is smaller than 10%, while the catalyst supports of the prior art are just the opposite.

It can be seen from Table 4 that the catalysts provided by the present invention have higher strength. The strengths of all the catalysts provided by the present invention are not lower than 13.5 N/mm, while the strengths of all the catalysts of the prior art are not higher than 10.5 N/mm.

Example 6

The following example shows the catalytic performances of the catalysts provided by the present invention.

Iron naphthenate was added to the LVGO (light vacuum gas oil) furfural refined oil of naphthenic crude oil (containing 27 ppm of iron) until it contains 100 ppm of iron to obtain feed oil 1# (its properties are shown in Table 6) for evaluating the deferrization and coke-deposit-resistant performances. Into a 0.5 l of vibrating autoclave reactor were added 10 g of Catalyst C1 of 40–60 mesh and 200 ml of aforesaid feed oil 1#. After replacing air with hydrogen, the autoclave was pressed with hydrogen to 4 MPa and heated to 380° C. The pressure was raised to 8 MPa. The reaction proceeded for 2 h at a stirring rate of 60 times/min. The autoclave was stripped with hydrogen for 1 h. After separating the oil with the catalyst, the content of iron in the resulted oil was analyzed. The amount of coke deposit and the mercury intrusion pore volume were determined after toluene Solex extraction. The results are shown in Table 7, wherein the method for determining the coke deposit was referred to "Analytical Methods in Petrochemical Industry (RIPP Test Method)", pp. 418–419, Science Press, 1990. The method for determining the content of iron was referred to "Analytical Methods in Petrochemical Industry (RIPP Test Method)" pp. 380–383, Science Press, 1990.

The distribution of the deposited iron along the radial direction of the particle of Catalyst C1 was observed with electron probe micro-scanning analyzer (Model EPM 8100Q, Simazu, Japan). The results are shown in FIG. 1.

Comparative Examples 5–8

The following comparative examples show the catalytic performances of the reference catalysts.

Figure 2:
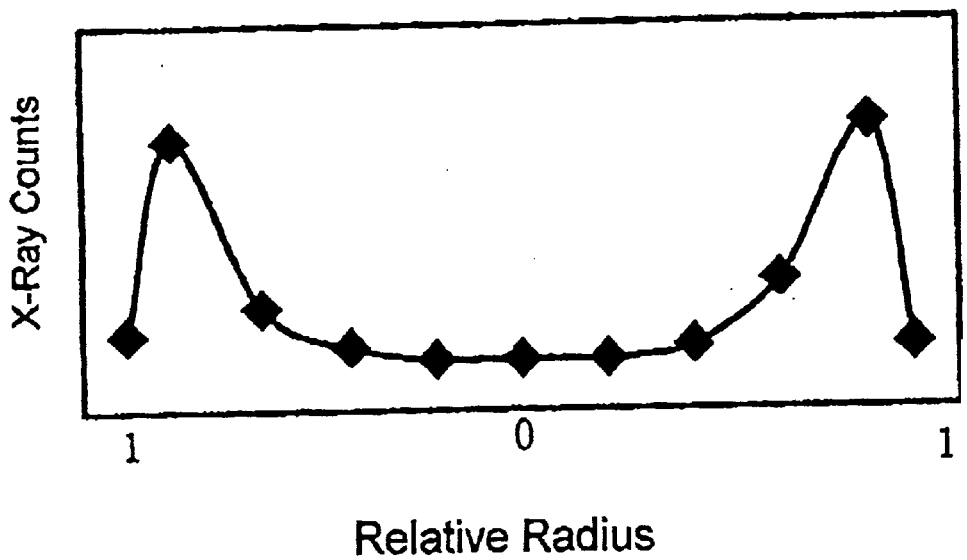
FIG. 2 is the distribution profile of iron deposited on the reference catalyst.

The catalysts were evaluated according to the method in Example 6, except that Reference Catalysts CB1–CB4 prepared in Comparative Example 1–4 were used to replace C1, respectively. The amount of carbon deposit, deferrization rate and pore volume reduction rate of Catalysts CB1–CB4 are show in Table 7. The distribution of the deposited iron along the radial direction of the particle of Catalyst C1 was observed with electron probe micro-scanning analyzer (Model EPM 8100Q, Simazu, Japan). The results are shown in FIG. 2.

Examples 7–10

The following examples show the catalytic performances of the catalyst provided by the present invention.

The activities of the catalysts were evaluated according to the method in Example 6, except that catalysts C2–C5 were used to replace C1, respectively. The evaluation results are shown in Table 7.

TABLE 6

| No. of feed oil | 1 # | 2 # |
|---|---|---|
| Name of feed oil | Iron naphthenate added LVGO furfural refined oil of naphthenic crude oil | LVGO forfural refined oil of naphthenic crude oil |
| Density (20° C.), g/cm³ | 0.9716 | 0.9807 |
| Viscosity (40° C.), mm²/s | 50.1 | 63.2 |
| Carbon residue, wt % | 13 | 15.2 |
| Iron content, ppm | 100 | 27.2 |

TABLE 7

| No. of example | No. of catalyst | Carbon deposit, wt % | Deferrization rate, wt % | Reduction rate of pore volume, % |
|---|---|---|---|---|
| 6 | C1 | 6.8 | 85.2 | 15.0 |
| Comparative Example 5 | CB1 | 10.5 | 65.3 | 40.2 |
| Comparative Example 6 | CB2 | 15.8 | 82.1 | 38.0 |
| Comparative Example 7 | CB3 | 14.7 | 80.1 | 24.1 |
| Comparative Example 8 | CB4 | 18.8 | 80.9 | 30.4 |
| 7 | C2 | 8.2 | 87.4 | 20.1 |
| 8 | C3 | 8.8 | 87.3 | 15.3 |

TABLE 7-continued

| No. of example | No. of catalyst | Carbon deposit, wt % | Deferrization rate, wt % | Reduction rate of pore volume, % |
|---|---|---|---|---|
| 9 | C4 | 6.0 | 84.3 | 13.0 |
| 10 | C5 | 8.0 | 82.7 | 21.9 |

The results in Table 7 demonstrate that the activities of tile catalysts provided by the present invention for deferrization were markedly higher than those of the reference catalysts, and the amount of coke deposit and the reduction rate of the pore volume were markedly lower than those of the reference catalysts. The results in FIGS. 1 and 2 demonstrate that the iron depositing on the catalysts provided by the present invention was more uniformly distributed, and there was no great difference between the iron contents at the center and at the surface. But the distribution of the iron depositing on Reference Catalyst CB1 were very non-uniform. The amount of the iron deposited at the surface of the catalyst particle was markedly greater than that at the center. This means that the catalysts provided by the present invention has higher ability to lodge iron deposit Example 11

The present example shows the stability of the catalyst provided by the present invention.

Feed oil 2# shown in Table 6 was used as a feed to evaluate the stability of Catalyst C1 in removing the carbon residue. The reaction was carried out in a 100 ml of continuous down-flow reactor with 100 ml of the catalyst of 40–60 mesh being loaded The reaction conditions were a temperature of 380° C., a pressure of 10 MPa, a hydrogen/oil volume ratio of 800, and a liquid hourly space velocity of 10 $h^{-1}$. The removal rate of the carbon residue as a function of time is shown by line 1 in FIG. 3.

Comparative Examples 9–11

The following comparative example shows the stability of activity of the reference catalysts.

The stability of activity of the catalyst was evaluated according to the method in Example 11, except that Reference Catalysts CB1, CB2 and CB3 were used to replace Catalyst C1, respectively. The results are shown by lines 2, 3 and 4 in FIG. 3, respectively.

Figure 3:
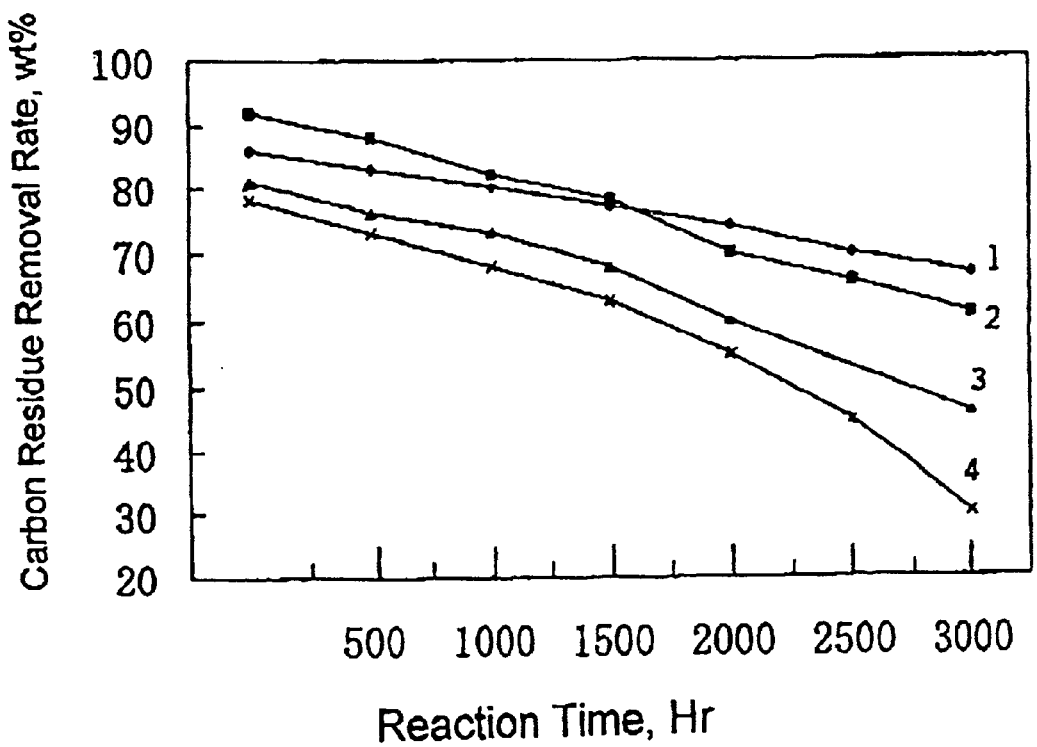
FIG. 3 is the rate of carbon residue removal as a function of time on stream.
Figure 4:
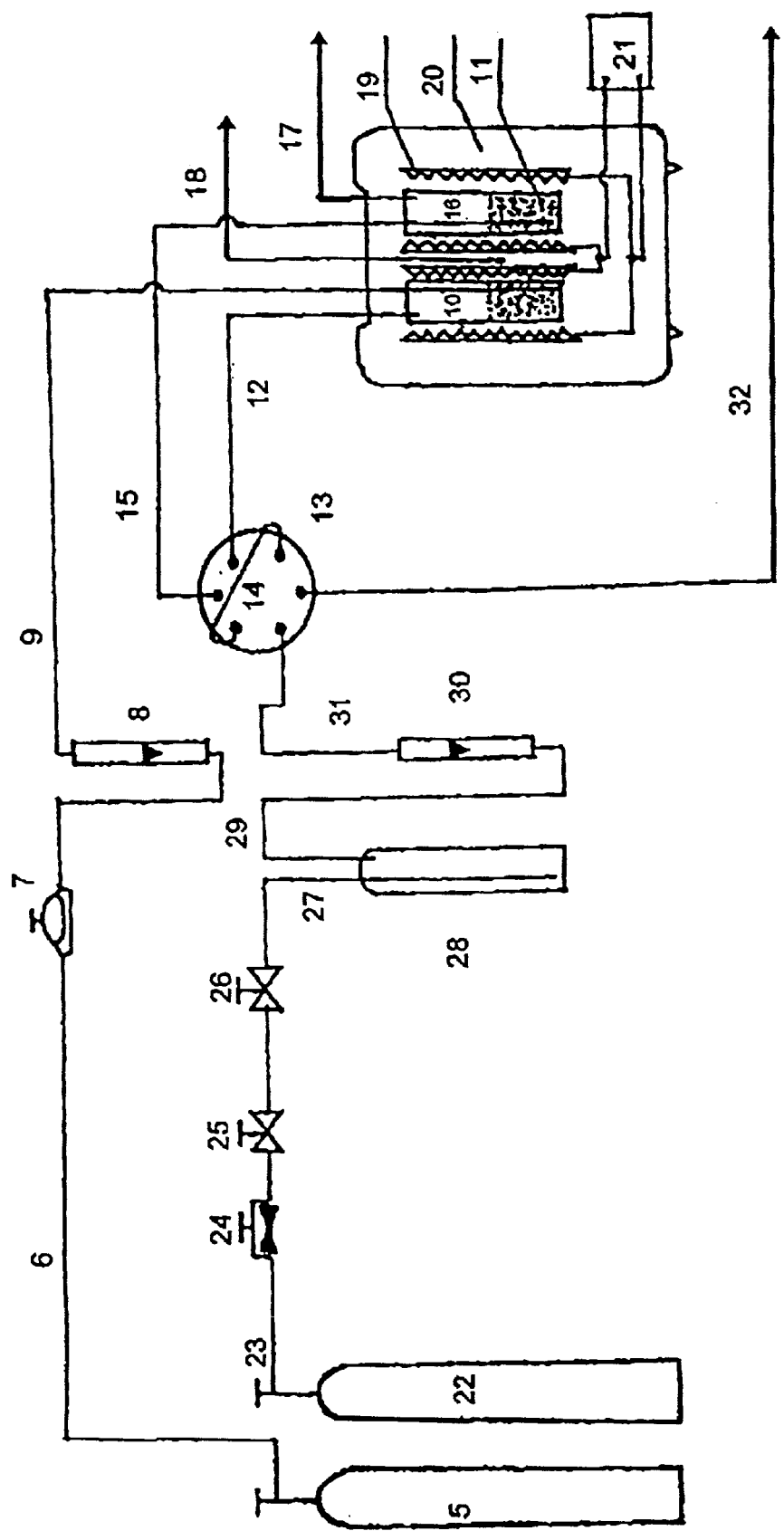
FIG. 4 is the schematic flow sheet of the apparatus for determining the adsorption heat of the alumina support.

It can be seen from the results in FIG. 3 that the reduction rate of the carbon residue removal activity of the catalyst provided by the present invention was slower compared to the reference catalysts, showing that the catalyst provided by the present invention has higher stability of activity.

What is claimed is:

1. A guard catalyst, comprising an alumina support, and at least one of molybdenum or tungsten and at least one of nickel or cobalt supported on the alumina support, wherein the total ammonia integral adsorption of heat of said alumina support does not exceed 25 J/g, the percentage taken up by the ammonia integral adsorption heat of ammonia differential adsorption heat greater than 100 kJ/mol does not exceed 10% of the total ammonia integral adsorption heat.

2. The catalyst according to claim 1, wherein the total ammonia integral adsorption heat of said alumina support is 20–25 J/g, the percentage of the ammonia integral adsorption heat with the ammonia differential adsorption heat greater than 100 kJ/mol accounts for 7–10% of the total ammonia integral adsorption heat.

3. The catalyst according to claim 1 or 2, wherein said alumina is γ-alumina.

4. The catalyst according to claim 1, wherein said catalyst has the following pore distribution: the volume of the pores with the diameters of 100–200 Å accounts for 50–90% of the total pore volume, the volume of the pores with the diameters of 200–1000 Å accounts for 5–30% of the total pore volume, the volume of the pores with diameters greater than 1000 Å accounts for 5–40% of the total pore volume, the remaining volume is that of the pores with diameters smaller than 100 Å.

5. The catalyst according to claim 4, wherein the catalyst has the following pore distribution: the volume of the pores with the diameters of 100–200 Å accounts for 55–80% of the total pore volume, the volume of the pores with the diameters of 200–1000 Å accounts for 5–20% of the total pore volume, the volume of the pores with diameters greater than 1000 Å accounts for 8–25% of the total pore volume, and the remaining volume is that of the pores with diameters smaller than 100 Å.

6. The catalyst according to claim 1, wherein the content of molybdenum and/or tungsten is 1–10 wt %, and the content of nickel and/or cobalt is 0.5–3 wt % based on the total weight of the catalyst and calculated as oxides.

7. The catalyst according to claim 6, wherein the content of molybdenum and/or tungsten is 4–9 wt %, and the content of nickel and/or cobalt is 0.5–2.5 wt % based on the total weight of the catalyst and calculated as oxides.

8. A process for preparing the catalyst of claim 1, which comprises mixing hydrated alumina, carbon black powder, organic pore expander, peptizator and water, molding by extrusion, drying, calcining, impregnating metal components, and drying and calcining again, wherein said carbon black powder has been regulated and the wet carbon powder has a pH of at least 8, wherein the amount of each component is such that 1 part by weight of alumina corresponds to 0.03 to less than 0.05 by weight of carbon black powder, 0.05–0.2 part by weight of organic pore expander, and 0.02–0.05 by weight of peptizator.

9. The process according to claim 8, wherein the pH of said wet carbon black powder is 8–12.

10. The process according to claim 8, wherein said hydrated alumina is pseudo-boehmite.

11. The process according to claim 8, wherein the method for regulating the pH of the wet carbon black powder comprises mixing a solution of nitrogen-containing alkali compound with said carbon black powder, then adding an acid solution to allow the pH of the mixture to attain at least 8, and removing the solution by filtration to obtain the carbon black powder with a pH of at least 8.

12. The process according to claim 11, wherein the amounts of said solution of nitrogen-containing alkali compound and the acid solution are such that the pH of said mixture is 8–12.

13. The process according to claim 11 or 12, wherein said solution of nitrogen-containing alkali compound is one or more selected from the group consisting of aqueous solution of ammonia, aqueous solution of organic amine, and urea solution, said acidic solution is one or more selected from the group consisting of solutions of nitric acid, hydrochloric acid and organic acids with 1–5 carbon atoms, and mixtures of any two or more of the foregoing.

14. The process according to claim 13, wherein said solution of nitrogen-containing alkali compound is aqueous ammonia, and said acidic solution is the solution of nitric acid.

15. The process according to claim 8, wherein said organic pore expander is one or more selected from the group consisting of polymerized alcohols, and ethers containing no nitrogen, non-ionic surfactants, and mixtures of any two or more of the foregoing.

16. The process according to claim 15, wherein said organic pore expander is one or more selected from the group consisting of polyethylene glycol, polyvinyl alcohol, and mixtures of any two or more of the foregoing.

17. The process according to claim 8, wherein said peptizator may be one or more selected from the group consisting of soluble aluminum salts, organic acids and inorganic acids.

18. The process according to claim 8, wherein the drying temperature of said molded alumina support is 90–150° C., the calcining temperature is 550–650° C., and the calcining time is 1–8 h.

19. The process according to claim 8, wherein the drying temperature after impregnation with metal components is 90–150° C., the calcining temperature is 450–550° C., and the calcining time is 1–8 h.

* * * * *